W. H. CROSBY.
TIRE.
APPLICATION FILED DEC. 20, 1919.
1,335,663.
Patented Mar. 30, 1920.
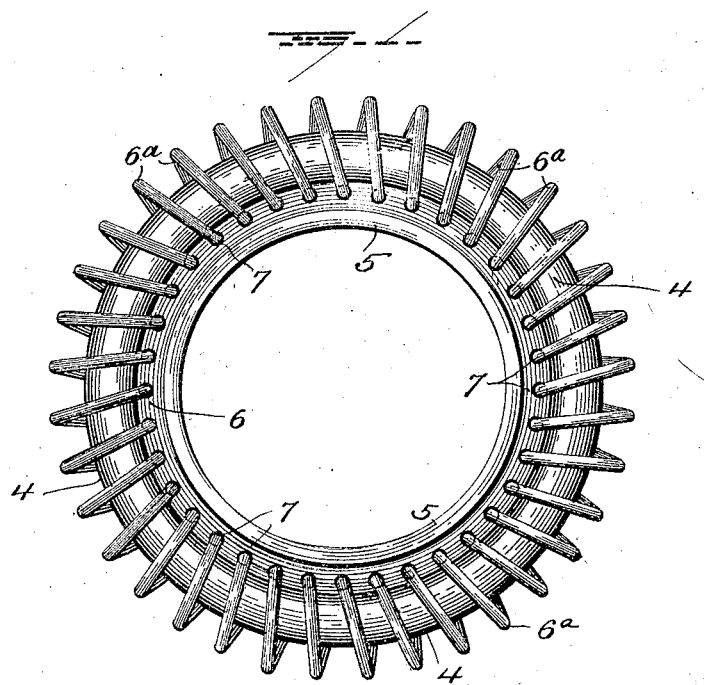
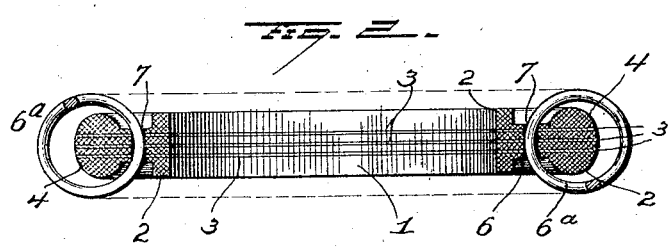
INVENTOR
W. H. Crosby
By Seymour & Bright
Attorneys

UNITED STATES PATENT OFFICE.

WILLIAM H. CROSBY, OF WATERVILLE, MAINE.

TIRE.

1,335,663. Specification of Letters Patent. Patented Mar. 30, 1920.

Application filed December 20, 1919. Serial No. 346,283.

*To all whom it may concern:*

Be it known that I, WILLIAM H. CROSBY, a citizen of the United States, and a resident of Waterville, in the county of Kennebec and State of Maine, have invented certain new and useful Improvements in Tires; and I do hereby declare the following to be a full, clear, and exact description of the invention, such as will enable others skilled in the art to which it appertains to make and use the same.

This invention relates to improvements in tires and more particularly to a combined tire and shoe—the object of the invention being to provide a structure which may readily be applied to a wheel; which will afford adequate resilience; which will prevent slipping, and which will avoid the throwing of dust and dirt.

With this and other objects in view, the invention consists in certain novel features of construction and combinations of parts as hereinafter set forth and pointed out in the claims.

In the accompanying drawings, Figure 1 is a view in side elevation of a tire embodying my invention, and Fig. 2 is a transverse sectional view.

The body portion 1 of the tire comprises a plurality of annular disks 2 of leather and annular disks 3 of fiberite alternating with the leather disks and all of said disks being secured together by riveting or otherwise,— and thus a tire body will be provided which possesses a degree of resilience but which is strong and durable.

The disks composing the tire body are so shaped that said tire body will be formed having an annular tread portion 4, an inner rim portion 5 and a web portion 6 between the tread and rim portions. The rim portion of the tire is intended to surround and embrace the rim of a wheel and may be connected with the latter in the same manner in which a demountable rim is applied to a wheel, any suitable demountable rim construction being employed.

A coil or spring 6ª of resilient wire surrounds the annular tread portion 4 of the tire,—the convolutions of said coil passing through holes 7 in the web portion of the tire, and said holes are so located and the diameter of the coil is such that the composite tire body will extend approximately three-fourths through the coil transversely of the latter. The peripheral portion of the tire body being disposed outwardly beyond the center of the coil, it will prevent the latter yielding too much and serve to hold said coil or spring in place when the vehicle is rounding a curve.

The fiberite disks between the leather disks serve to stiffen the latter.

My improved tire may be easily and quickly applied to a wheel; will prevent slipping; will afford adequate resilience, and will not tend to throw dust and dirt.

Slight changes might be made in the details of construction of my invention without departing from the spirit thereof or limiting its scope and hence I do not wish to restrict myself to the precise details herein set forth.

Having fully described my invention what what I claim as new and desire to secure by Letters-Patent, is—

1. A tire comprising an annular body portion having tread, rim and web portions, said web portion having holes, and a coil of resilient metal having its convolutions passing through the holes in the web portion of the tire body and inclosing the tread portion thereof.

2. A tire comprising an annular body portion comprising leather disks, said body portion having holes, and a coiled spring havings its convolutions passing through said holes and inclosing the peripheral portion of the body portion of the tire.

3. A tire comprising a body portion consisting of a plurality of alternating annular disks of leather and fiberite, said body portion having holes therein, and a coiled spring having its convolutions passing through said holes and inclosing the peripheral portion of the body portion of the tire.

4. A tire comprising an annular body portion having tread, rim and web portions, and a coiled spring having its convolutions passing through the web portion of the body portion and surrounding the tread portion of the latter, said tread portion extending within the coiled spring and terminating beyond the center thereof and inward of the outer periphery thereof.

In testimony whereof I have signed this specification in the presence of two subscribing witnesses.

WILLIAM H. CROSBY.

Witnesses:
 FRED L. SIMPSON,
 RANDOLPH C. SHORES.